June 4, 1929.  A. HAGEL  1,716,052
SAFETY PIN HOLDER
Filed Jan. 29, 1929
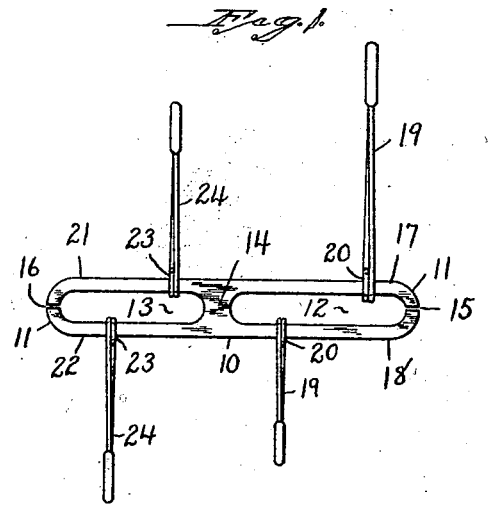
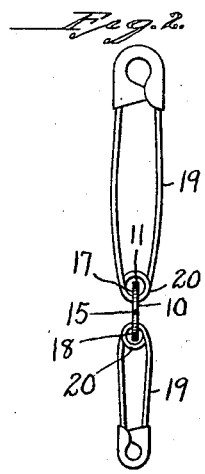
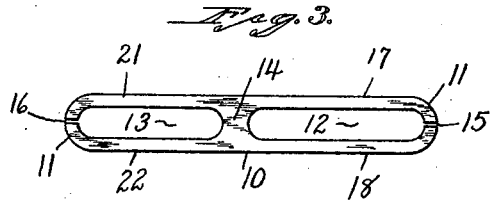
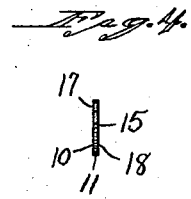
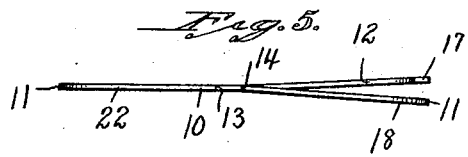
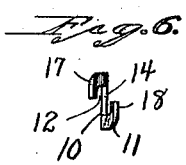
Inventor.
Albert Hagel Patented June 4, 1929.

1,716,052

UNITED STATES PATENT OFFICE.

ALBERT HAGEL, OF BLOOMFIELD, NEW JERSEY, ASSIGNOR TO CONSOLIDATED SAFETY PIN COMPANY, OF BLOOMFIELD, NEW JERSEY, A CORPORATION.

SAFETY-PIN HOLDER.

Application filed January 29, 1929. Serial No. 335,907.

My invention relates to an improvement in portable holders for safety pins, the object being to produce at the minimum cost for manufacture, a holder adapted to mount safety pins of four sizes and maintain their segregation while at the same time permitting them to be removed one by one with the utmost ease.

With these ends in view, my invention consists in a safety-pin holder consisting of a flat oblong plate of resilient sheet-metal provided with two axially-arranged slots separated from each other by a transverse web of the plate and each entered at its outer end by a slit producing complementary resilient spring-arms adapted to be flexed for mounting and demounting individual pins upon and from the holder.

In the accompanying drawings:

Fig. 1 is a face view of a safety-pin holder constructed in accordance with my invention;

Fig. 2 is an end view thereof;

Fig. 3 is a detached face view thereof;

Fig. 4 is a corresponding end view thereof;

Fig. 5 is an edge view thereof with the arms at one end sprung apart for mounting or demounting safety pins; and Fig. 6 is an end view thereof.

In carrying out my invention as herein shown, I employ a flat oblong plate 10 of resilient sheet-metal preferably having symmetrically-rounded ends 11 and formed with two axially-arranged slots 12 and 13 separated by a transverse web 14 and preferably of unequal length, though that is not essential. The slot 12 is entered by a slit 15 entering its outer end on the axial line of the holder, while the slot 13 is entered by a slit 16 entering its outer end also on the axial line of the holder. The slit 15 virtually produces two corresponding all-but abutting hooks 17 and 18 normally lying in the same plane but capable of being easily deflected so as to permit a safety pin, such as 19, to have its eye 20 passed over one or the other of the hooks either on entering the slot 12 or on leaving the same. Similarly, the slit 16 results in the production of two corresponding all-but abutting hooks 21 and 22 normally lying in the same plane but easily flexed so as to permit the eyes 23 of pins 24 to be passed over them in one direction or the other, according as the pins are to be mounted upon or demounted from the holder.

It will be understood that the metal of the plate is sufficiently resilient to cause the hooks to return to their normal positions of registration when the lateral pressure required for their deflection is removed.

My improved holder is so simple that it may be produced at a trifling cost and yet it constitutes a well-nigh perfect portable device for mounting safety pins and keeping them segregated as to size and, at the same time, rendering them very easy to remove one by one as wanted.

I claim:

A safety-pin holder, consisting of an oblong flat plate of resilient sheet-metal provided with two axially-arranged slots separated from each other by a transverse rib of the metal and entered at their outer ends by slits lying in the major axis of the plate and virtually dividing the ends of the plate into complementary hooks normally lying in the same plane but capable of deflection therefrom for the mounting and demounting of standard safety pins.

In testimony whereof, I have signed this specification.

ALBERT HAGEL.